(12) United States Patent
Oh

(10) Patent No.: US 11,975,672 B2
(45) Date of Patent: May 7, 2024

(54) ROOF-MOUNTED TYPE AIRBAG

(71) Applicants: Hyundai Motor Company, Seoul (KR); Kia Corporation, Seoul (KR)

(72) Inventor: Chang Jin Oh, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

(21) Appl. No.: 17/873,623

(22) Filed: Jul. 26, 2022

(65) Prior Publication Data

US 2023/0192024 A1 Jun. 22, 2023

(30) Foreign Application Priority Data

Dec. 22, 2021 (KR) .................. 10-2021-0185034

(51) Int. Cl.
*B60R 21/214* (2011.01)
*B60R 21/231* (2011.01)
*B60R 21/233* (2006.01)

(52) U.S. Cl.
CPC .......... *B60R 21/214* (2013.01); *B60R 21/233* (2013.01); *B60R 2021/23153* (2013.01); *B60R 2021/23161* (2013.01); *B60R 2021/23324* (2013.01)

(58) Field of Classification Search
CPC ........... B60R 2021/23107; B60R 2021/23153; B60R 2021/23161; B60R 2021/23192; B60R 2021/23308; B60R 2021/23324; B60R 2021/23386; B60R 21/214; B60R 21/232; B60R 21/233
See application file for complete search history.

(56) References Cited

U.S. PATENT DOCUMENTS

| | | | | |
|---|---|---|---|---|
| 7,195,276 B2* | 3/2007 | Higuchi | ............. | B60R 21/231 |
| | | | | 280/743.1 |
| 7,726,684 B2* | 6/2010 | Breed | .............. | B60R 21/239 |
| | | | | 280/743.1 |
| 8,328,228 B2* | 12/2012 | Lee | ............... | B60R 21/214 |
| | | | | 280/743.1 |
| 8,403,358 B2* | 3/2013 | Choi | ............. | B60R 21/214 |
| | | | | 280/743.2 |
| 9,446,733 B2* | 9/2016 | Pausch | ............ | B60R 21/2334 |
| 9,902,362 B2* | 2/2018 | Farooq | ............. | B60N 2/14 |
| 10,065,592 B2* | 9/2018 | Jaradi | ............. | B60R 21/214 |
| 10,343,642 B2* | 7/2019 | Faruque | ............ | B60R 21/214 |
| 10,589,708 B2* | 3/2020 | Cho | ............. | B60R 21/0136 |
| 10,688,955 B2* | 6/2020 | Shin | ............. | B60R 21/214 |
| 10,703,320 B2* | 7/2020 | Farooq | ............. | B60R 21/231 |
| 10,857,965 B2* | 12/2020 | Abe | ............. | B60R 21/214 |
| 10,981,531 B2* | 4/2021 | Jaradi | ............. | B60N 2/143 |
| 11,066,032 B2* | 7/2021 | Jaradi | ............. | B60R 21/205 |

(Continued)

FOREIGN PATENT DOCUMENTS

KR 20210083515 A 7/2021

*Primary Examiner* — Laura Freedman
(74) *Attorney, Agent, or Firm* — Slater Matsil, LLP

(57) ABSTRACT

An embodiment roof-mounted type airbag includes a housing to be mounted to a roof part, a center cushion foldable inside the housing and able to be vertically unfolded between facing seats of a vehicle, wherein the center cushion is pillar-shaped, a side cushion foldable inside the housing and able to be unfolded partially along a circumference of the center cushion, and an inflator connected to the center cushion or the side cushion.

20 Claims, 7 Drawing Sheets

(56) References Cited

U.S. PATENT DOCUMENTS

| | | | |
|---|---|---|---|
| 11,117,540 B2* | 9/2021 | Hwangbo | B60R 21/233 |
| 11,465,579 B1* | 10/2022 | Faruque | B60R 21/213 |
| 11,648,908 B2* | 5/2023 | Sung | B60R 21/231 |
| | | | 280/730.1 |
| 2020/0139923 A1* | 5/2020 | Ostling | B60R 21/233 |
| 2020/0384940 A1* | 12/2020 | Sekizuka | B60R 21/0132 |
| 2020/0406852 A1* | 12/2020 | Fischer | B60R 21/2338 |
| 2021/0031718 A1* | 2/2021 | Schultz | B60R 21/231 |
| 2021/0197748 A1 | 7/2021 | Jeong et al. | |

* cited by examiner

ROOF-MOUNTED TYPE AIRBAG

CROSS-REFERENCE TO RELATED APPLICATIONS

The present application claims the benefit of Korean Patent Application No. 10-2021-0185034, filed on Dec. 22, 2021, which application is hereby incorporated herein by reference.

TECHNICAL FIELD

The present invention relates generally to a roof-mounted type airbag.

BACKGROUND

An autonomous vehicle has various seat arrangements such as a long travel mode, a swivel mode, and a relaxation mode.

In order to safely protect occupants seated in seats, restriction devices such as airbags are mounted in various forms not only to the seat but also to the indoor space of the vehicle.

Meanwhile, in a vehicle with seats arranged in a longitudinally facing form in the vehicle room, an airbag is mounted to a center portion of a roof located between the front and rear seats.

Then, when a vehicle collision occurs, a cushion mounted to a roof panel is unfolded downward and simultaneously the cushion is expanded toward the occupants seated in the front and rear seats. Therefore, the occupants in the seats are loaded on front and rear surfaces of the cushion and are protected.

However, since the cushion unfolded from the roof part needs a large volume, there is a problem in that unfolding of the cushion is delayed. Furthermore, since a force to support movement of the occupant is weak, the cushion is shaken together with the occupant in a collision direction, i.e., a loaded direction of the occupant while hanging on the roof in loading of the occupant, so that there is a problem in that the occupant is not safely protected.

The foregoing is intended merely to aid in the understanding of the background of the present invention, and is not intended to mean that the present invention falls within the purview of the related art that is already known to those skilled in the art.

SUMMARY

The present invention relates generally to a roof-mounted type airbag. Particular embodiments relate to a roof-mounted type airbag configured to be quickly unfolded with a dual-type cushion unfolded from a roof part and to be limited in movement thereof to safely protect an occupant.

Accordingly, embodiments of the present invention keep in mind problems occurring in the related art, and embodiments of the present invention provide a roof-mounted type airbag with a dual type cushion unfolded from a roof part, wherein the cushion is configured to be quickly unfolded and to be limited in movement thereof to safely protect an occupant.

According to one embodiment of the present invention, there is provided a roof-mounted type airbag including a housing mounted to a roof part, a pillar-shaped center cushion configured to be folded inside the housing and to be vertically unfolded between occupants who face each other, a side cushion configured to be folded inside the housing and to be unfolded partially along a circumference of the center cushion to restrict the occupants, and an inflator connected to at least any one of the center cushion and the side cushion and configured to supply gas into the center cushion and the side cushion.

The center cushion may be radially arranged based on a vertical shaft direction, and the side cushion may be coupled to an outer surface of the center cushion.

The center cushion and another center cushion may be connected to each other by a center connecting part in a vertical longitudinal direction thereof.

The center cushion may be configured to be unfolded between the roof part and a bottom surface of a vehicle.

The side cushion may be configured to be unfolded after the center cushion is unfolded.

A communication hole may be provided between the center cushion and the side cushion, and the communication hole may be configured to allow gas injected into the center cushion to be supplied into the side cushion.

The side cushion may be configured to be supported by a plurality of center cushions located adjacent to each other.

The side cushion and another adjacent side cushion may be connected to each other by a side connecting part in a form in which the side connecting part may cover outer surfaces of the side cushions.

The side cushion may have a vent hole.

A horizontal section area of the side cushion may be greater than a horizontal section area of the center cushion.

As described above, as the airbag of embodiments of the present invention has the cushion divided into the center cushion and the side cushion, the center cushion is unfolded first and the side cushion is unfolded second. Therefore, the volume of the cushion is significantly reduced, so that the airbag can be quickly unfolded.

Furthermore, as the plurality of cylindrical center cushions are unfolded in the integral form, the self-stiffness of the center cushion is secured and simultaneously the unfolding stability of the center cushion is secured. Therefore, the movement of the cushion is minimized, so that the occupant loaded on the airbag cushion can be stably supported.

Furthermore, as the side cushion is unfolded along the circumference of the center cushion, the unfolding area of the side cushion is widened. Therefore, the protection coverage of the side cushion is widened, so that the occupant can be safely protected.

BRIEF DESCRIPTION OF THE DRAWINGS

The above and other objectives, features, and other advantages of embodiments of the present invention will be more clearly understood from the following detailed description when taken in conjunction with the accompanying drawings, in which.

DETAILED DESCRIPTION OF ILLUSTRATIVE EMBODIMENTS

Figure 1:
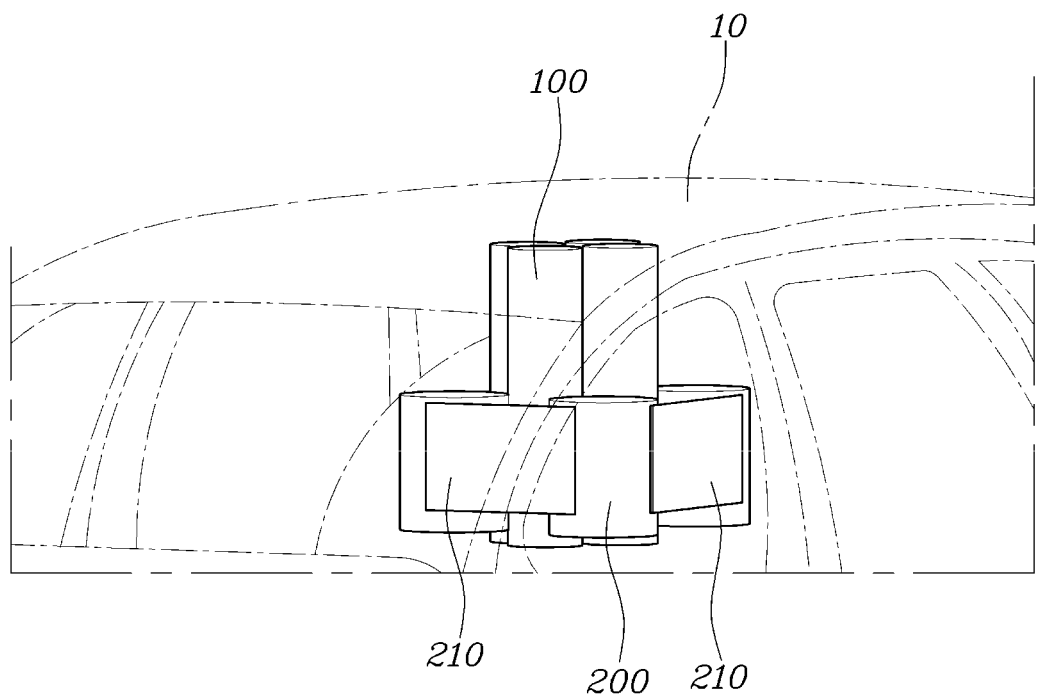
FIG. 1 is a view showing an airbag according to embodiments of the present invention mounted to a roof part.

In the following description, the structural or functional description specified to exemplary embodiments according to the concept of the present invention is intended to describe the exemplary embodiments, so it should be understood that the present invention may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present invention are not limited to the embodiments which will be described hereinbelow with reference to the accompanying drawings, but all modifications, equivalents, and substitutions are included in the scope and spirit of the invention.

It will be understood that, although the terms first and/or second, etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, such as, "between", "directly between", "adjacent", or "directly adjacent" should be interpreted in the same manner as those described above.

The terminology used herein is for the purpose of describing particular embodiments only and is not intended to limit the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

Hereinbelow, exemplary embodiments will be described hereafter in detail with reference to the accompanying drawings. Like reference numerals given in the drawings indicate like components.

FIG. 1 is a view showing an airbag according to embodiments of the present invention mounted to a roof part.

Referring to FIG. 1, a roof-mounted type airbag of embodiments of the present invention is suitable to be applied to a seat structure in which front seats and rear seats face each other. An airbag module including a center cushion wo and a side cushion 200 is mounted to the inside space of a center roof part 10 located between the front seats and the rear seats.

Therefore, in a vehicle collision, the center cushion 100 and the side cushion 200 are unfolded downward from the roof part 10 toward a space between the front seats and the rear seats, so that the center cushion 100 and the side cushion 200 serve to protect occupants in the front seats and the rear seats.

Figure 2:
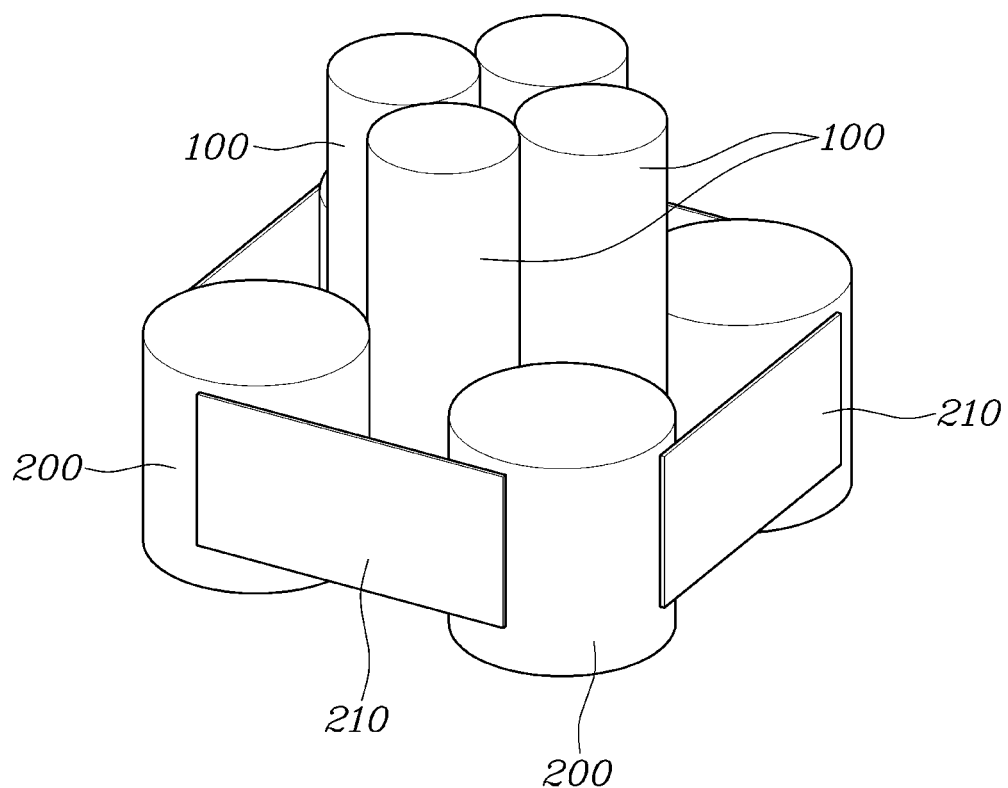
FIG. 2 is a view showing a 3-D unfolded shape of the airbag according to embodiments of the present invention.
Figure 3:
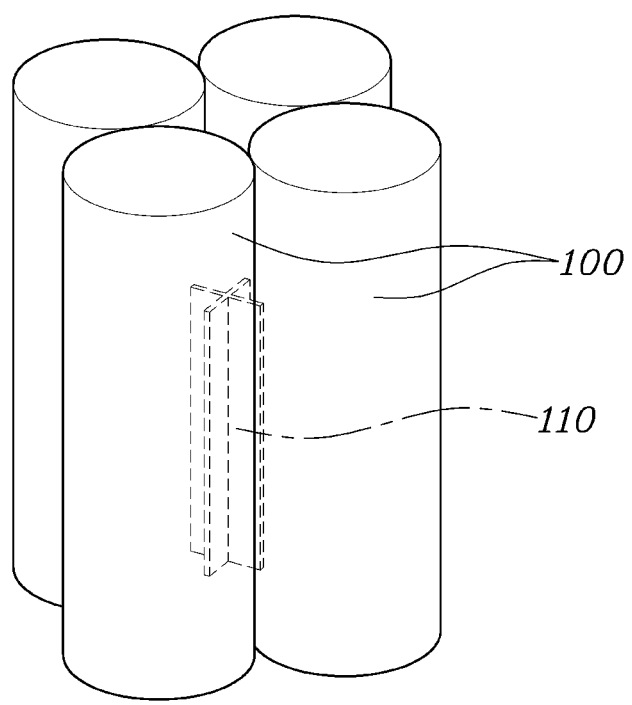
FIG. 3 is a plan view showing the unfolded shape of the airbag according to embodiments of the present invention.

Meanwhile, FIG. 2 is a view showing a 3-D unfolded shape of the airbag according to embodiments of the present invention. FIG. 3 is a plan view showing the unfolded shape of the airbag according to embodiments of the present invention.

Referring to the drawings, the roof-mounted type airbag according to embodiments of the present invention includes a housing 20 mounted to the roof part 10 (see, e.g., FIG. 5), the pillar-shaped center cushion 100 folded inside the housing 20 and vertically unfolded between the occupants facing each other, the side cushion 200 folded inside the housing 20, and unfolded partially along the circumference of the center cushion 100 to restrict the occupants, and an inflator 30 connected to at least any one of the center cushion 100 and the side cushion 200 and supplying gas.

For example, the center cushion 100 is shaped in a long cylinder in a vertical longitudinal direction and is unfolded directly downward from the roof part 10.

Then, the side cushion 200 is also shaped in a cylinder and is unfolded at an outer surface of the circumference of the center cushion 100.

A cushion of the airbag divided into the center cushion 100 and the side cushion 200 is unfolded downward from the roof part 10. The side cushion 200 is unfolded toward the occupants at the circumference of the center cushion 100.

Therefore, the volume of the entire airbag is significantly reduced compared to the existing airbag, so that the airbag is quickly unfolded and is increased in the protection coverage for the occupants by the side cushion 200, thereby safely protecting the occupants.

In addition, as shown in FIGS. 2 and 3, the center cushion 100 is radially provided on a vertical shaft direction, and the side cushion 200 is coupled to an outside surface of the center cushion 100.

For example, on the basis of an imaginary unfolding axis in which the center cushion 100 is unfolded downward, four cylindrical center cushions 100 are arranged on front, rear, left, and right at equal angles side by side.

Then, four side cushions 200 are unfolded at outer surfaces of the center cushions 100 at equal angles.

Figure 4:
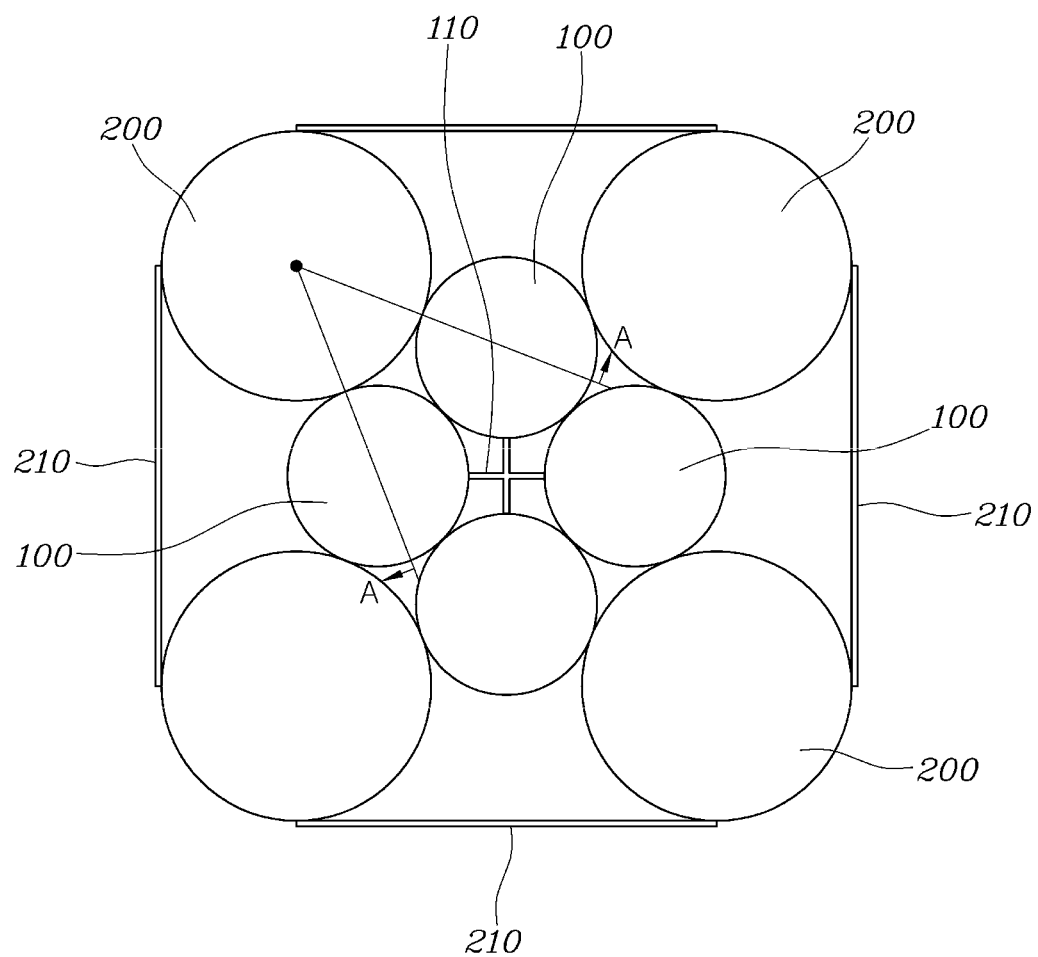
FIG. 4 is a view showing a connection structure in which center cushions according to embodiments of the present invention are connected to each other by a center connecting part.

In addition, FIG. 4 is a view showing a connection structure in which the center cushions 100 according to embodiments of the present invention are connected to each other by a center connecting part no. Referring to the drawing, the center cushion 100 and another center cushion 100 are connected to each other by the center connecting part no in the vertical direction.

For example, the center connecting part no is a panel member lengthily formed in the vertical direction with a cross section.

Therefore, each corner of the center connecting part no is fixed in an inner surface of the center cushion 100, so that the center cushions 100 are connected to each other by the center connecting part no and thus are fixed together.

The multiple cylindrical center cushions 100 are connected to each other by the center connecting part no to be integrated, so that the self-stiffness of the center cushion 100 is secured and the unfolding stability of the center cushion 100 is secured. Therefore, movement of the cushion is minimized, so that the occupants loaded on the airbag cushion are stably supported.

In addition, the center cushion 100 may be unfolded between the roof part 10 and the bottom surface of a vehicle.

Figure 5:
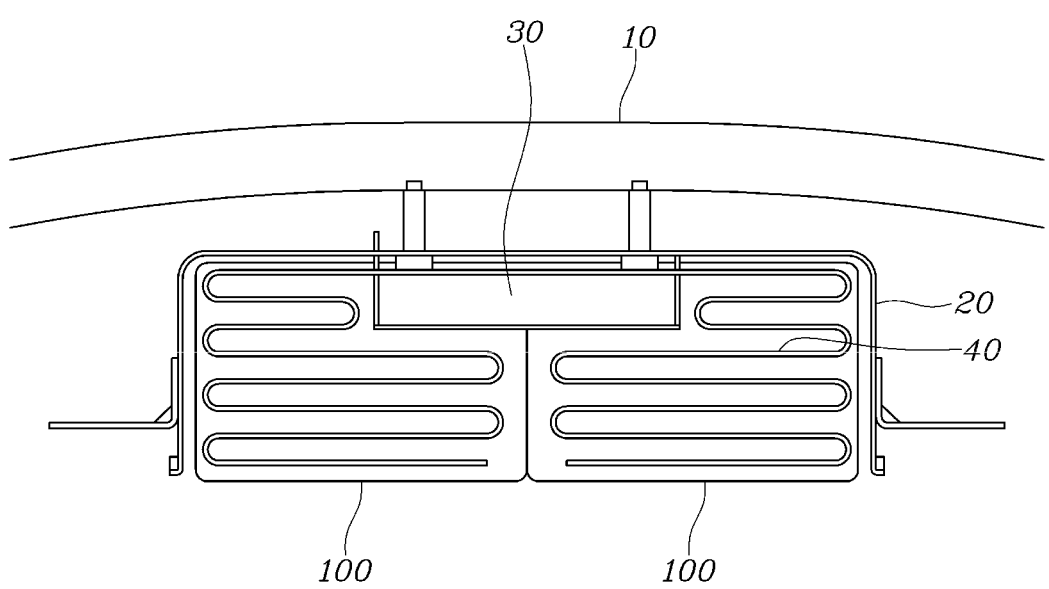
FIG. 5 is a view showing a structure of the airbag according to embodiments of the present invention mounted to a roof panel.

For example, as shown in FIGS. 1 and 5, the housing 20 is mounted to a roof panel mounted to the roof part 10, and the inflator 30 is mounted to the inside space of the housing 20.

Then, the center cushion 100 is connected to the inflator 30 together with a diffuser 40. Herein, the diffuser 40 is connected to the four center cushions 100 and gas supplied from the inflator 30 is evenly injected into each of the center cushions 100 through the diffuser 40.

Therefore, as the center cushions 100 are unfolded downward from the roof part 10 of the vehicle, the center cushions 100 are unfolded from the roof part 10 of the vehicle toward the bottom surface in the vehicle room or a center console, thereby serving as a supporting structure of the airbag.

Figure 6:
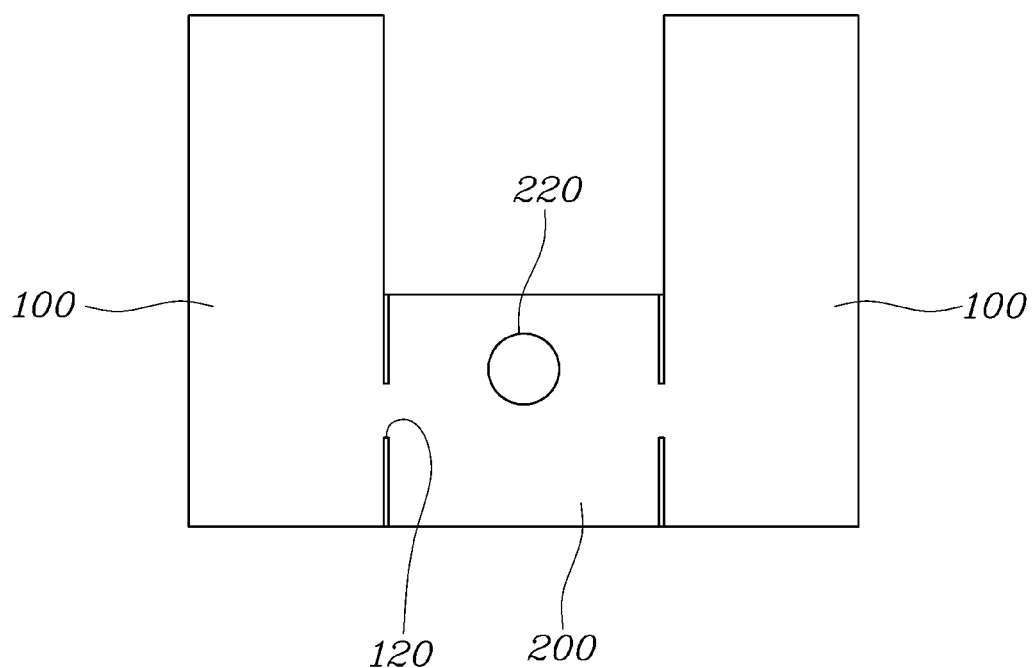
FIG. 6 is a sectional view taken along line A-A in FIG. 4.
Figure 7:
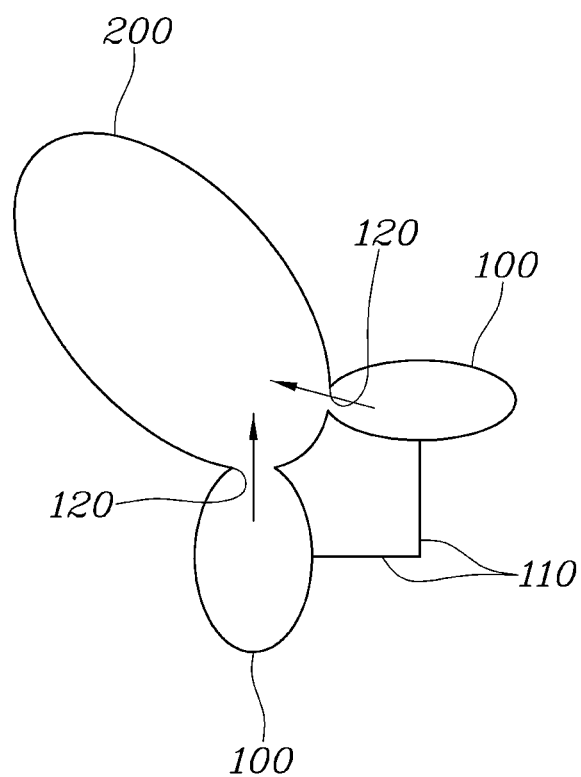
FIG. 7 is a view showing gas supply from the center cushions to a side cushion according to embodiments of the present invention.

Meanwhile, FIG. 6 is a sectional view taken along line A-A in FIG. 4. FIG. 7 is a view showing gas supply from the center cushion 100 toward the side cushion 200 according to embodiments of the present invention.

Referring to the drawings, the side cushion 200 may be configured to be unfolded after the center cushion 100 is unfolded.

Gas generated by the inflator 30 is supplied into the center cushion 100 to unfold the center cushion 100 first, and after the center cushion 100 is unfolded, or in an unfolding process of the center cushion 100, the side cushion 200 is unfolded second.

Therefore, the volume of the airbag cushion is significantly reduced, so that the airbag can be quickly unfolded.

In addition, after the center cushion 100 is unfolded, as a method for unfolding the side cushion 200, the airbag of embodiments of the present invention may have a communication hole 120. The communication hole 120 is provided between the center cushion 100 and the side cushion 200, so that the gas injected into the center cushion 100 may be supplied into the side cushion 200.

In other words, the communication hole 120 is formed by coupling a side surface of the center cushion 100 and a side surface of the side cushion 200 by sewing with a portion of the sewn surfaces through which the center cushion 100 and the side cushion 200 communicate with each other.

Therefore, the center cushion 100 is unfolded first by the gas of the inflator 30, and the gas in the center cushion 100 flows into the side cushion 200 through the communication hole 120, so that the side cushion 200 is unfolded second.

Meanwhile, referring to FIGS. 2 and 3, the side cushion 200 of embodiments of the present invention may be provided in a state where the side cushion 200 is supported by a plurality of center cushions 100 adjacent to each other.

For example, an outer surface of one side cushion 200 is supported and coupled to outer surfaces of two adjacent center cushions 100, so that the two center cushions 100 and the one side cushion 200 form a triangle.

Therefore, as shaking of the side cushion 200 coupled to the center cushions 100 is minimized, the body of the occupant loaded on the side cushion 200 is restricted and safely protected.

In addition, the side cushion 200 and another adjacent side cushion 200 may be connected to each other by a side connecting part 210 in a form where outer surfaces of the side cushions 200 are covered by the side connecting part 210.

For example, the side connecting part 210 is a panel member shaped in a wide plate. A first end of the side connecting part 210 is fixed to an outer side surface of one of the two adjacent side cushions 200 by sewing, and a second end of the side connecting part 210 is fixed to an outer side surface of another one of the two adjacent side cushions 200 by sewing.

Therefore, as the side connecting part 210 is fixed in a form where the side connecting part 210 encloses the side cushion 200, the side cushions 200 may be fixed together.

As the plurality of side cushions 200 are integrally connected to each other by the side connecting part 210, the side cushions 200 are firmly fixed to the center cushions 100, whereby the bodies of the occupants loaded on the side cushions 200 are safely protected.

Then, as shown in FIGS. 6 and 7, embodiments of the present invention may include the side cushion 200 with the vent hole 220 and the center cushion 100 without the vent hole 220.

In other words, at a timing point where the occupant is loaded on the side cushion 200, as the gas in the side cushion 200 is discharged through the vent hole 220, an impact generated when the occupant hits the side cushion 200 is absorbed, whereby the body of the occupant is safely restricted.

Since the vent hole 220 is not formed in the center cushion 100, an internal pressure of the side cushion 200 is reduced but an internal pressure of the center cushion 100 is maintained above a predetermined pressure, so that the performance of supporting the center cushion 100 is maintained.

Meanwhile, in embodiments of the present invention, a horizontal section area of the side cushion 200 may be formed greater than a horizontal section area of the center cushion 100.

For example, as each of the center cushion 100 and the side cushion 200 is formed in a cylinder, each of the horizontal section area of the side cushion 200 and the horizontal section area of the center cushion 100 is formed in a circle.

However, a diameter of the side cushion 200 is formed greater than a diameter of the center cushion 100, so that an unfolding area of the side cushion 200 is widened. Therefore, the protection coverage of the side cushion 200 is widened and the occupant is safely protected.

For example, the side cushion 200 may be formed in various shapes, but in this case, a horizontal section area of the side cushion 200 is also formed smaller than a horizontal section area of the center cushion 100.

Hereinbelow, an operation process of the roof-mounted type airbag according to embodiments of the present invention will be described.

When a vehicle collision occurs, a collision signal is input into an airbag controller, and the inflator 30 explodes and generates gas.

Then, the gas of the inflator 30 is distributed by the diffuser 40 and supplied into the center cushion 100, so that the center cushion 100 is expanded downward from the roof part 10 and the center cushion 100 is unfolded first.

Next, the gas filled in the center cushion 100 is supplied into the side cushion 200 via the communication hole 120 formed between the center cushion 100 and the side cushion 200. Then, the side cushion 200 is expanded and unfolded second around the center cushion 100.

In addition, depending on a vehicle colliding direction, an occupant seated on the front seats or the rear seats is moved toward the airbag.

Then, the body of the occupant is loaded on an outer surface of the side cushion 200 facing the occupant. As the gas in the side cushion 200 is discharged via the vent hole 220 formed in the side cushion 200 in a loading process, the side cushion 200 absorbs an impact when the occupant hits the side cushion 200, thereby stably restricting the body of the occupant.

As described above, the airbag of embodiments of the present invention has the cushion divided into the center cushion 100 and the side cushion 200 and the center cushion 100 is unfolded first and the side cushion 200 is unfolded second. Therefore, the volume of the airbag cushion is significantly reduced, so that the airbag can be rapidly unfolded.

Furthermore, as the plurality of cylindrical center cushions wo are unfolded in the integral form, the self-stiffness of the center cushion wo is secured and simultaneously the unfolding stability of the center cushion wo is secured. Therefore, movement of the cushion is minimized, so that the occupant loaded on the cushion is stably supported.

Furthermore, as the side cushion 200 is unfolded along the circumference of the center cushion 100, the unfolding area of the side cushion 200 is widened, whereby the protection coverage of the side cushion 200 is widened. Therefore, the occupant is safely protected.

Although the preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A roof-mountable airbag comprising:
   a housing to be mounted to a roof part;
   a center cushion foldable inside the housing and able to be vertically unfolded between facing seats of a vehicle, wherein the center cushion is pillar-shaped;
   a side cushion foldable inside the housing and able to be unfolded partially along a circumference of the center cushion; and
   an inflator connected to the center cushion or the side cushion;
   wherein the center cushion is radially arranged based on a vertical shaft direction;
   wherein the side cushion is coupled to an outer surface of the center cushion; and
   wherein the center cushion and another center cushion are connected to each other by a center connecting part in a vertical longitudinal direction thereof.

2. The roof-mountable airbag of claim 1, wherein the center cushion is configured to be unfolded between the roof part and a bottom surface of the vehicle.

3. The roof-mountable airbag of claim 1, wherein the side cushion is configured to be unfolded after the center cushion is unfolded.

4. The roof-mountable airbag of claim 3, further comprising a communication hole provided between the center cushion and the side cushion, wherein the communication hole is configured to allow gas injected into the center cushion to be supplied into the side cushion.

5. The roof-mountable airbag of claim 1, wherein the side cushion is configured to be supported by the center cushion and the another center cushion.

6. The roof-mountable airbag of claim 1, wherein the side cushion and another adjacent side cushion are connected to each other by a side connecting part such that the side connecting part covers outer surfaces of the side cushion and the another adjacent side cushion.

7. The roof-mountable airbag of claim 1, wherein the side cushion has a vent hole.

8. The roof-mountable airbag of claim 1, wherein a horizontal section area of the side cushion is greater than a horizontal section area of the center cushion.

9. A method of forming a roof-mountable airbag, the method comprising:
   forming a center cushion having a pillar shape folded inside a housing, wherein the center cushion is capable of being vertically unfolded between facing seats of a vehicle in event of a collision;
   forming a side cushion folded inside the housing, wherein the side cushion is capable of being unfolded partially along a circumference of the center cushion; and
   forming an inflator connected to the center cushion or the side cushion to supply gas into the center cushion and the side cushion;
   wherein the center cushion is radially arranged based on a vertical shaft direction;
   wherein the side cushion is coupled to an outer surface of the center cushion; and
   wherein the center cushion and another center cushion are connected to each other by a center connecting part in a vertical longitudinal direction thereof.

10. The method of claim 9, wherein the center cushion is capable of being unfolded between a roof part and a bottom surface of the vehicle.

11. The method of claim 9, wherein the side cushion is unfolded after the center cushion is unfolded in the event of the collision.

12. The method of claim 11, further comprising forming a communication hole between the center cushion and the side cushion, wherein the communication hole allows gas injected into the center cushion to be supplied into the side cushion.

13. The method of claim 9, wherein the side cushion is supported by the center cushion and the another center cushion.

14. The method of claim 9, wherein the side cushion and another adjacent side cushion are connected to each other by a side connecting part such that the side connecting part covers outer surfaces of the side cushion and the another adjacent side cushion.

15. The method of claim 9, further comprising forming a vent hole in the side cushion.

16. The method of claim 9, wherein a horizontal section area of the side cushion is greater than a horizontal section area of the center cushion.

17. A roof-mountable airbag comprising:
    a housing to be mounted to a roof part;
    a first center cushion foldable inside the housing and able to be vertically unfolded between facing seats of a vehicle, wherein the first center cushion is pillar-shaped;

a side cushion foldable inside the housing and able to be unfolded partially along a circumference of the first center cushion; and an inflator connected to the first center cushion or the side cushion;

wherein the first center cushion is radially arranged based on a vertical shaft direction;

wherein the side cushion is coupled to an outer surface of the first center cushion; and wherein the side cushion is configured to be supported by a plurality of center cushions located adjacent to each other, the first center cushion being one of the plurality of center cushions.

18. The roof-mountable airbag of claim 17, wherein the first center cushion is configured to be unfolded between the roof part and a bottom surface of the vehicle.

19. The roof-mountable airbag of claim 17, wherein the side cushion is configured to be unfolded after the first center cushion is unfolded.

20. The roof-mountable airbag of claim 19, further comprising a communication hole provided between the first center cushion and the side cushion, wherein the communication hole is configured to allow gas injected into the first center cushion to be supplied into the side cushion.

* * * * *